United States Patent
Nagata et al.

(10) Patent No.: US 11,623,601 B2
(45) Date of Patent: Apr. 11, 2023

(54) HEAD PROTECTION AIRBAG DEVICE

(71) Applicant: TOYODA GOSEI CO., LTD., Kiyosu (JP)

(72) Inventors: Matsuo Nagata, Kiyosu (JP); Jun Sato, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/473,035

(22) Filed: Sep. 13, 2021

(65) Prior Publication Data

US 2022/0080922 A1    Mar. 17, 2022

(30) Foreign Application Priority Data

Sep. 16, 2020  (JP) .............................. JP2020-155582

(51) Int. Cl.
  *B60R 21/232*    (2011.01)
  *B60R 21/213*    (2011.01)
  *B60R 21/00*    (2006.01)

(52) U.S. Cl.
  CPC .......... *B60R 21/232* (2013.01); *B60R 21/213* (2013.01); *B60R 2021/0009* (2013.01); *B60R 2021/0048* (2013.01)

(58) Field of Classification Search
  CPC .... B60R 2021/0009; B60R 2021/0023; B60R 2021/0048; B60R 2021/23308; B60R 2021/23316; B60R 2021/2612; B60R 2021/2617; B60R 21/213; B60R 21/232; B60R 21/233
  See application file for complete search history.

(56) References Cited

U.S. PATENT DOCUMENTS

| | | | |
|---|---|---|---|
| 6,851,707 B2 * | 2/2005 | Bakhsh | B60R 21/237 280/730.2 |
| 7,407,182 B2 * | 8/2008 | Aoki | B60R 21/201 280/730.2 |
| 7,699,342 B2 * | 4/2010 | Goto | B60R 21/232 280/730.2 |

(Continued)

FOREIGN PATENT DOCUMENTS

| | | |
|---|---|---|
| JP | 2006-168721 A | 6/2006 |
| JP | 2011116155 A * | 6/2011 |

(Continued)

*Primary Examiner* — Laura Freedman
(74) *Attorney, Agent, or Firm* — Posz Law Group, PLC

(57) ABSTRACT

A head protection airbag device includes an airbag including a front seat protection portion, and an end side expansion portion, and a partition closing portion. The airbag is configured to be provided with a single receiving area where the head which moves diagonally forward at the time of an oblique collision or an offset collision of the vehicle is received by the front seat protection portion, and a collaborative receiving area where the head is received by the front seat protection portion and the end side expansion portion. The partition closing portion is linearly provided to be inclined forward and downward in a state where the airbag is viewed from a side when the expansion of the airbag is completed. The collaborative receiving area includes vehicle inner side surfaces of the end side expansion portion and the front seat protection portion with the partition closing portion interposed therebetween.

4 Claims, 8 Drawing Sheets

(56) References Cited

U.S. PATENT DOCUMENTS

| | | | | |
|---|---|---|---|---|
| 7,850,202 B2* | 12/2010 | Boxey | | B60R 21/217 |
| | | | | 280/736 |
| 8,033,568 B2* | 10/2011 | Tanaka | | B60R 21/2346 |
| | | | | 280/730.2 |
| 8,608,193 B1* | 12/2013 | Wysocki | | B60R 21/233 |
| | | | | 280/730.2 |
| 8,708,365 B2* | 4/2014 | Fulmer | | B60R 21/20 |
| | | | | 280/730.2 |
| 8,851,508 B1* | 10/2014 | Rickenbach | | B60R 21/239 |
| | | | | 280/730.2 |
| 8,905,432 B2* | 12/2014 | Nakashima | | B60R 21/26 |
| | | | | 280/732 |
| 8,955,875 B2* | 2/2015 | Maita | | B60R 21/23138 |
| | | | | 280/730.2 |
| 8,998,250 B2* | 4/2015 | Kruse | | B60R 21/232 |
| | | | | 280/730.2 |
| 9,027,954 B2* | 5/2015 | Konishi | | B60R 21/23138 |
| | | | | 280/728.2 |
| 9,308,884 B2* | 4/2016 | Ochiai | | B60R 21/213 |
| 9,487,180 B2* | 11/2016 | Nakashima | | B60R 21/213 |
| 9,731,676 B2* | 8/2017 | Nagasawa | | B60R 21/2346 |
| 9,783,150 B2* | 10/2017 | Saiki | | B60R 21/232 |
| 10,000,174 B2* | 6/2018 | Okuhara | | B60R 21/232 |
| 10,493,943 B2* | 12/2019 | Sugimori | | B60R 21/2338 |
| 11,247,631 B2* | 2/2022 | Kakimoto | | B60R 21/213 |
| 11,358,560 B2* | 6/2022 | Kamiyama | | B60R 21/232 |
| 2006/0012156 A1* | 1/2006 | Boxey | | B60R 21/232 |
| | | | | 280/730.2 |
| 2006/0097491 A1* | 5/2006 | Saberan | | B60R 21/232 |
| | | | | 280/730.2 |
| 2006/0128244 A1 | 6/2006 | Hill | | |
| 2017/0182967 A1 | 6/2017 | Suzuki | | |
| 2019/0001913 A1* | 1/2019 | Okuhara | | B60R 21/237 |

FOREIGN PATENT DOCUMENTS

| | | | | |
|---|---|---|---|---|
| JP | 2012250598 A | * | 12/2012 | ......... B60R 21/232 |
| JP | 2016-055824 A | | 4/2016 | |
| JP | 2017-114250 A | | 6/2017 | |
| JP | 2020-040487 A | | 3/2020 | |

* cited by examiner

HEAD PROTECTION AIRBAG DEVICE

CROSS-REFERENCE TO RELATED APPLICATIONS

This application is based on and claims priority under 35 USC 119 from Japanese Patent Application No. 2020-155582 filed on Sep. 16, 2020.

TECHNICAL FIELD

The present disclosure relates to a head protection airbag device including an airbag having a front seat protection portion arranged so as to cover a side of a head of an occupant seated in a front seat and an end side expansion portion arranged adjacent to a front side of the front seat protection portion.

BACKGROUND ART

In a related art, as a head protection airbag device, there is a head protection airbag device configured to protects a head of an occupant by making the head move diagonally forward while making the head come into contact with an airbag which is expanded to cover a vehicle inner side of a window at the time of an oblique collision or offset collision of a vehicle (see, for example, JP-A-2020-40487 and JP-A-2016-55824). When the head of the occupant moves diagonally forward while in contact with the airbag, the head of the occupant receives a force which causes the head to rotate toward a vehicle inner side along a horizontal direction due to a frictional force generated between the head and the airbag. Therefore, in any of head protection airbag devices described in JP-A-2020-40487 and JP-A-2016-55824, in order to smoothly protect the head, a rotational force acting on the head is configured to be reduced.

In the head protection airbag device described in JP-A-2020-40487, a regulation tether separate from an airbag is provided on a vehicle inner side surface side of the airbag which covers a side of a head to regulate a completed expansion shape of the airbag, thereby reducing a rotational force acting on the head. In the head protection airbag device described in JP-A-2016-55824, a sliding cloth separate from an airbag is provided on a vehicle inner side surface side of the airbag which covers a side of a head to reduce a rotational force acting on the head during contact. That is, each of the head protection airbag devices described in JP-A-2020-40487 and JP-A-2016-55824 has a configuration in which a member separate from the airbag is separately provided. Therefore, the configuration is not simple and there is room for improvement in terms of making the device compact so that the device can be stored in a narrow accommodation space on an upper edge side of a window.

The present disclosure solves the problems described above and an object of the present disclosure is to provide a head protection airbag device in which a head of an occupant which moves diagonally forward can be smoothly restrained by an airbag which completes expansion, as a simple configuration.

SUMMARY OF INVENTION

According to an aspect of the present disclosure, there is provided a head protection airbag device including:

an airbag which is folded and accommodated on an upper edge side of a window on a vehicle inner side of a vehicle, an upper edge side of which is attached and fixed to a body side of the vehicle, and allows expansion gas from an inflator to flow in and deploys and expands to cover the vehicle inner side of the window while protruding downward, the air bag including a front seat protection portion which is arranged to cover a side of a head of an occupant seated in a front seat when expansion of the airbag is completed, and an end side expansion portion which is a front end side of the airbag when the expansion of the airbag is completed and is arranged adjacent to a front side of the front seat protection portion, the end side expansion portion being expanded by inflowing the expansion gas into an inside the end side expansion portion through the front seat protection portion; and a partition closing portion which partitions the front seat protection portion and the end side expansion portion and is configured to combine a vehicle inner side wall portion arranged on the vehicle inner side and a vehicle outer side wall portion arranged on a vehicle outer side when the expansion of the airbag is complete; in which the airbag is configured to be provided with:

a single receiving area where the head which moves diagonally forward at the time of an oblique collision or an offset collision of the vehicle is received by the front seat protection portion; and a collaborative receiving area where the head is received by the front seat protection portion and the end side expansion portion, the partition closing portion is linearly provided to be inclined forward and downward in a state where the airbag is viewed from a side when the expansion of the airbag is completed, and the collaborative receiving area includes vehicle inner side surfaces of the end side expansion portion and the front seat protection portion with the partition closing portion interposed therebetween.

In the head protection airbag device of the present disclosure, the head of the occupant which moves diagonally forward at the time of an oblique collision or an offset collision of the vehicle is first received by the front seat protection portion in the single receiving area, and then in the collaborative receiving area, the head is received by the front seat protection portion and the end side expansion portion. However, the linear partition closing portion which partitions the front seat protection portion and the end side expansion portion is formed to be inclined forward and downward and the collaborative receiving area includes the vehicle inner side surface of the end side expansion portion and the front seat protection portion with the partition closing portion interposed therebetween. Therefore, when the head is viewed from a side which is the inner side of the vehicle, the head of the occupant which moves diagonally forward while coming into contact with the airbag does not move so as to straddle the partition closing portion on an orthogonal direction side, but moves substantially along the partition closing portion. As a result, the head of the occupant which moves diagonally forward can be smoothly moved from the single receiving area to the collaborative receiving area while being received by the end side expansion portion and the front seat protection portion. In addition, in the collaborative receiving area, the head moves diagonally forward while being in contact with both the end side expansion portion and the front seat protection portion with the partition closing portion interposed therebetween, and thus a contact area of the airbag itself with the head is also small. Therefore, it is possible to suppress as much as possible the generation of a force which causes the head of the occupant which moves diagonally forward to rotate toward the vehicle inner side along a horizontal direction, and thus the head of the occupant can be smoothly moved diagonally forward while being in contact with the airbag and the head can be received by the end side expansion portion. In the head protection airbag device of the present invention, unlike the head protection airbag device of the related art, without using an extra member, by adjusting the arrangement position and shape of the partition closing portion which partitions the end side expansion portion having a configuration which expands by inflowing the expansion gas into the inside through the front seat protection portion and the front seat protection portion, such an effect can be obtained. As a result, the configuration can be simplified. Also, since no extra member is used, the airbag can be folded compactly and is not bulky, and further the airbag can be smoothly accommodated in a narrow accommodation space on the upper edge side of the window.

Therefore, in the head protection airbag device of the present invention, as a simple configuration, the head of the occupant moving diagonally forward can be smoothly restrained by the airbag which completes expansion.

In the head protection airbag device of the present invention, in a state where the airbag is viewed from the side when the expansion of the airbag is completed, the partition closing portion is configured to position a rear end of the partition closing portion on a front side of a reference line along an up-down direction passing through a center of the head of the occupant seated in the front seat. In the front seat protection portion, the partition closing portion is not arranged above and below an area which protects the head of the occupant at the time of a side collision. Therefore, it is preferably possible to secure a sufficient thickness at the time of completion of expansion of an area which protects the head of the occupant at the time of a side collision.

In the head protection airbag device having the configuration described above, in a state where the airbag is viewed from the side when the expansion of the airbag is completed, the partition closing portion is configured so that a front end side is closer to a movement locus of the head moving diagonally forward than a rear end side. It is preferably possible to secure a large volume of the end side expansion portion, as compared with the case where the partition closing portion is inclined so as to be substantially along the movement locus of the head.

In the head protection airbag device having the configuration described above, an inversion portion is provided on a front end side of the partition closing portion to invert rearward and downward. It is preferably possible to secure a larger volume of the end side expansion portion and the expansion gas is allowed to flow into the end side expansion portion from a gap on a lower end side of the inversion portion, and thus the start of inflow of the expansion gas into the end side expansion portion can be reliably delayed as compared with the front seat protection portion.

DESCRIPTION OF EMBODIMENT

Figure 1:
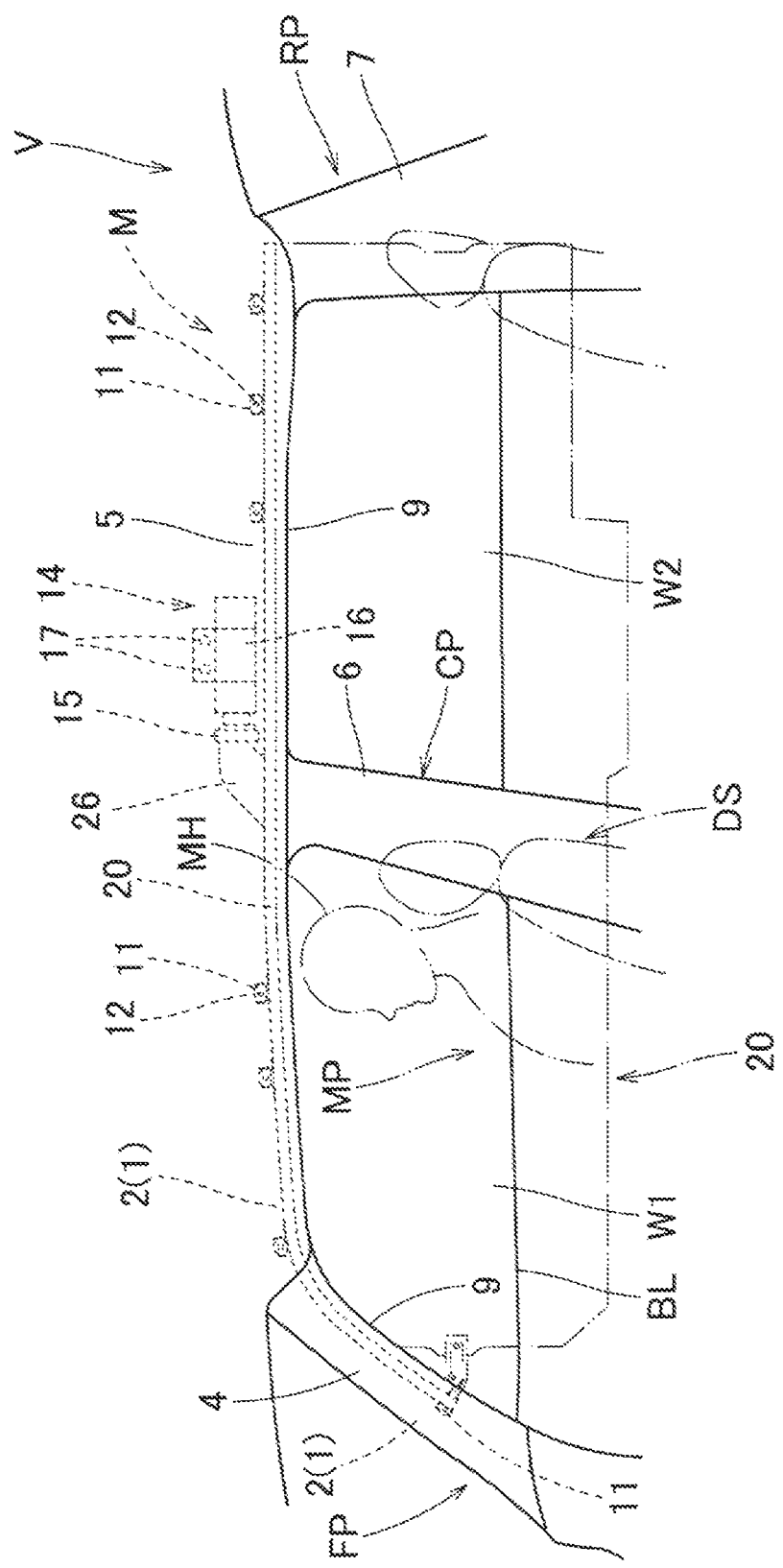
FIG. 1 is a schematic front view of a head protection airbag device according to an embodiment of the invention as viewed from a vehicle inner side.

Hereinafter, an embodiment of the present disclosure will be described with reference to the drawings. As illustrated in FIG. 1, a head protection airbag device M of the embodiment is mounted on a double-row seat type vehicle V having two windows (side windows) W1 and W2. The head protection airbag device M mounted on an upper edge side of the windows W1 and W2 on a right side (vehicle outer side O) of a driver's seat DS in a right-hand drive vehicle will be described in the embodiment. As illustrated in FIG. 1, the head protection airbag device M of the embodiment includes an airbag 20, an inflator 14, mounting brackets 11 and 16, and an airbag cover 9. As illustrated in FIG. 1, the airbag 20 is folded and accommodated on an upper edge side of the windows W1 and W2 on the vehicle inner side of the vehicle V from a lower edge side of a front pillar portion FP, through a lower edge side of a roof side rail portion RR, to an area above a rear pillar portion RP.

Figure 8:
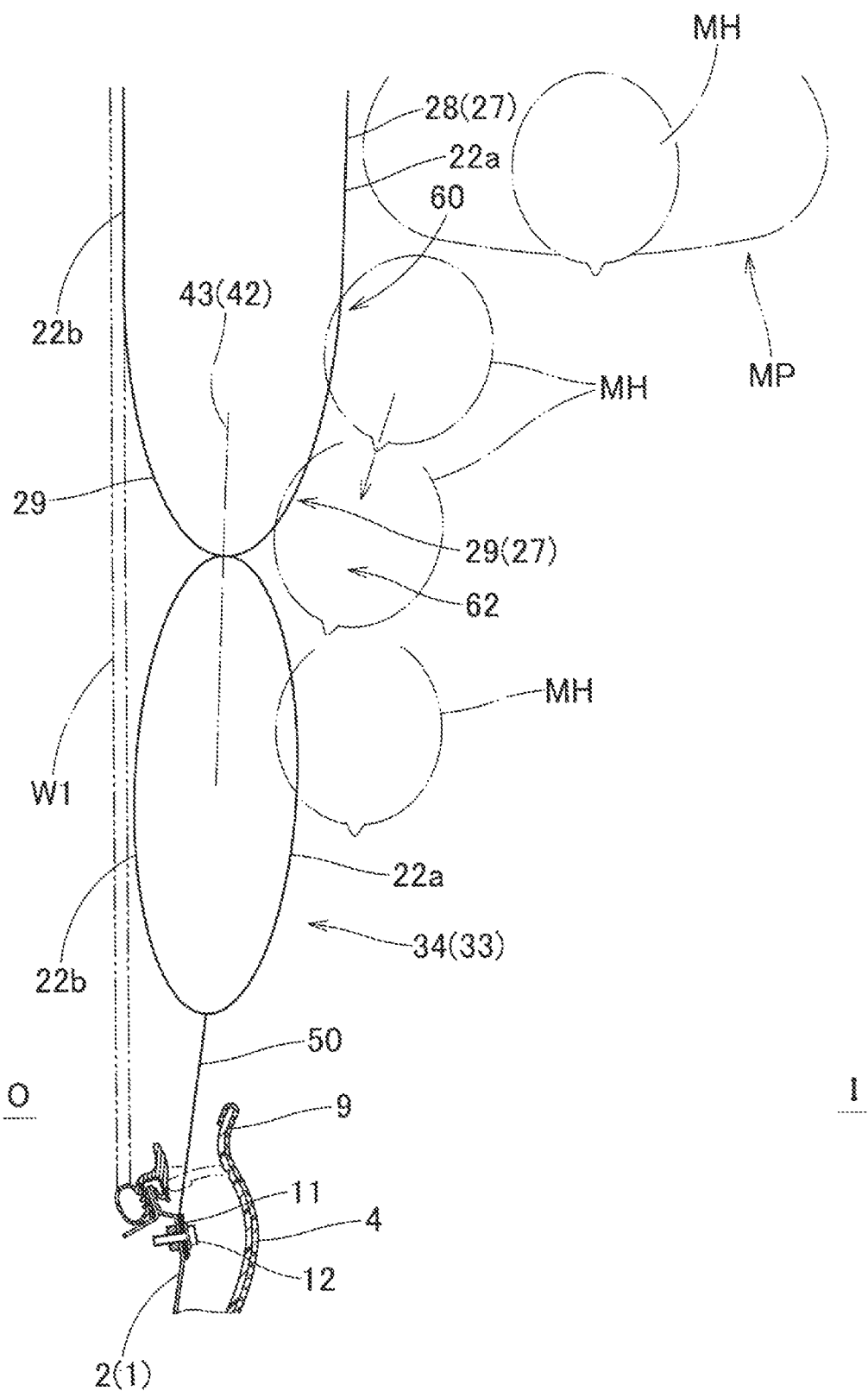
FIG. 8 is a schematic partially enlarged transverse cross-sectional view along a front-rear direction illustrating a state in which the airbag completes expansion in the head protection airbag device of the embodiment.

As illustrated in FIGS. 1 and 8, the airbag cover 9 includes lower edges of a front pillar garnish 4 arranged on the front pillar portion FP and a roof head lining 5 arranged on the roof side rail portion RR. The front pillar garnish 4 and the roof head lining 5 are made of synthetic resin and mounted and respectively fixed to an inner panel 2 on the vehicle inner side on a body 1 (vehicle body) side at the front pillar portion FP and the roof side rail portion RR. The airbag cover 9 covers the vehicle inner side of the airbag 20 which is folded and accommodated. Also, the airbag cover 9 is configured to be pushed by the airbag 20 and open to the vehicle inner side in order to allow the airbag 20 to protrude downward the vehicle inner side when deployed and expanded.

The inflator 14 supplies an expansion gas to the airbag 20. As illustrated in FIG. 1, the inflator 14 is a substantially cylindrical cylinder type and is provided with a gas discharge port (not illustrated) capable of discharging expansion gas on a tip side thereof. The inflator 14 is connected to the airbag 20 by inserting a tip side including a vicinity of the gas discharge port into a connection port portion 26 of the airbag 20 described below and using a clamp 15 arranged on an outer peripheral side of the connection port portion 26. The inflator 14 is attached to the inner panel 2 at a position above the window W2 by using the mounting bracket 16 for holding the inflator 14 and a bolt 17 for fixing the mounting bracket 16 to the inner panel 2 on the body 1 side (see FIG.

1). The inflator 14 is electrically connected to a control device (not illustrated) of the vehicle V via a lead wire (not illustrated). When the control device detects a side collision, an oblique collision, an offset collision, a rollover, or the like of the vehicle V, the inflator 14 is configured to operate by receiving an operation signal from the control device.

Figure 4:
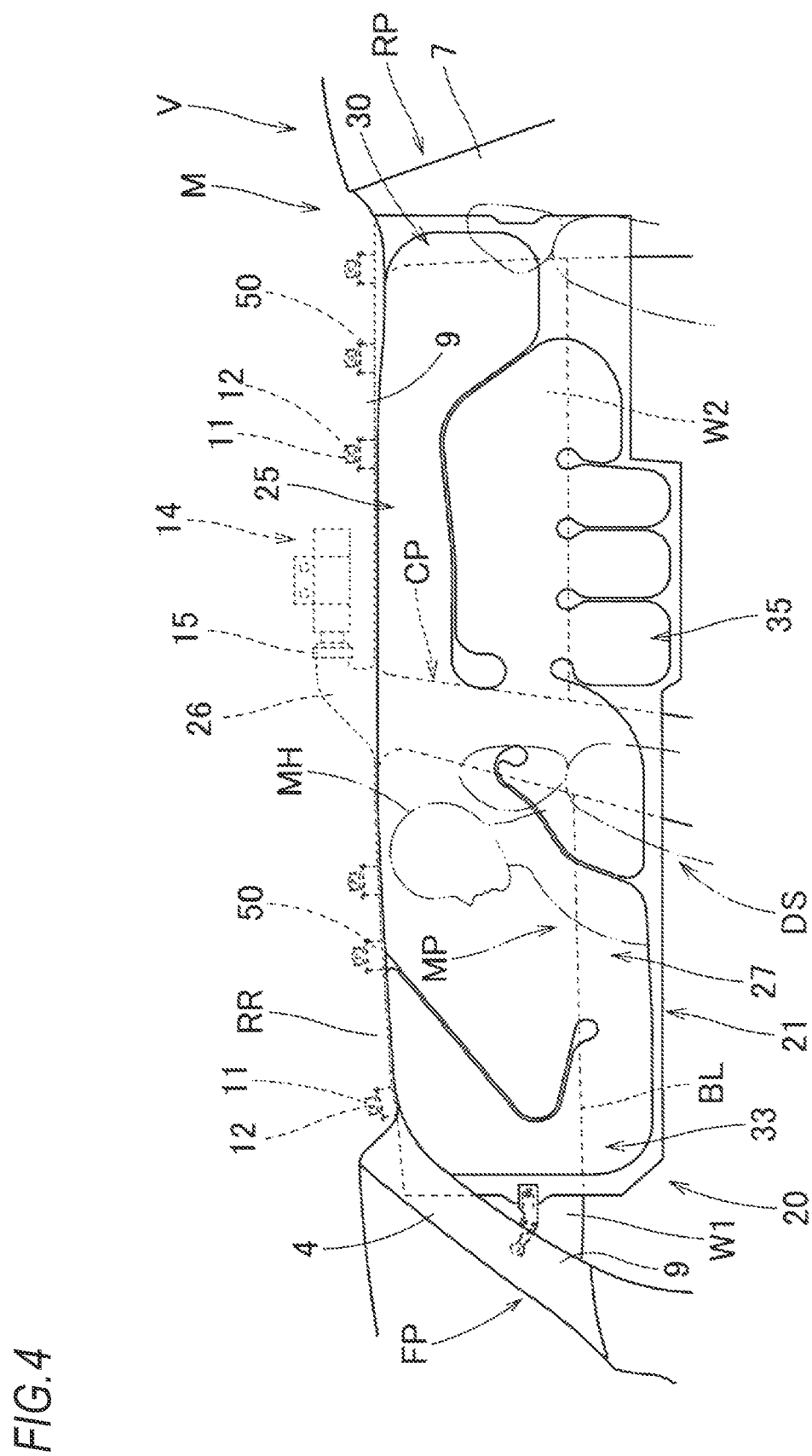
FIG. 4 is a schematic front view of the head protection airbag device of the embodiment illustrating a state in which the airbag completes expansion as viewed from the vehicle inner side.
Figure 5:
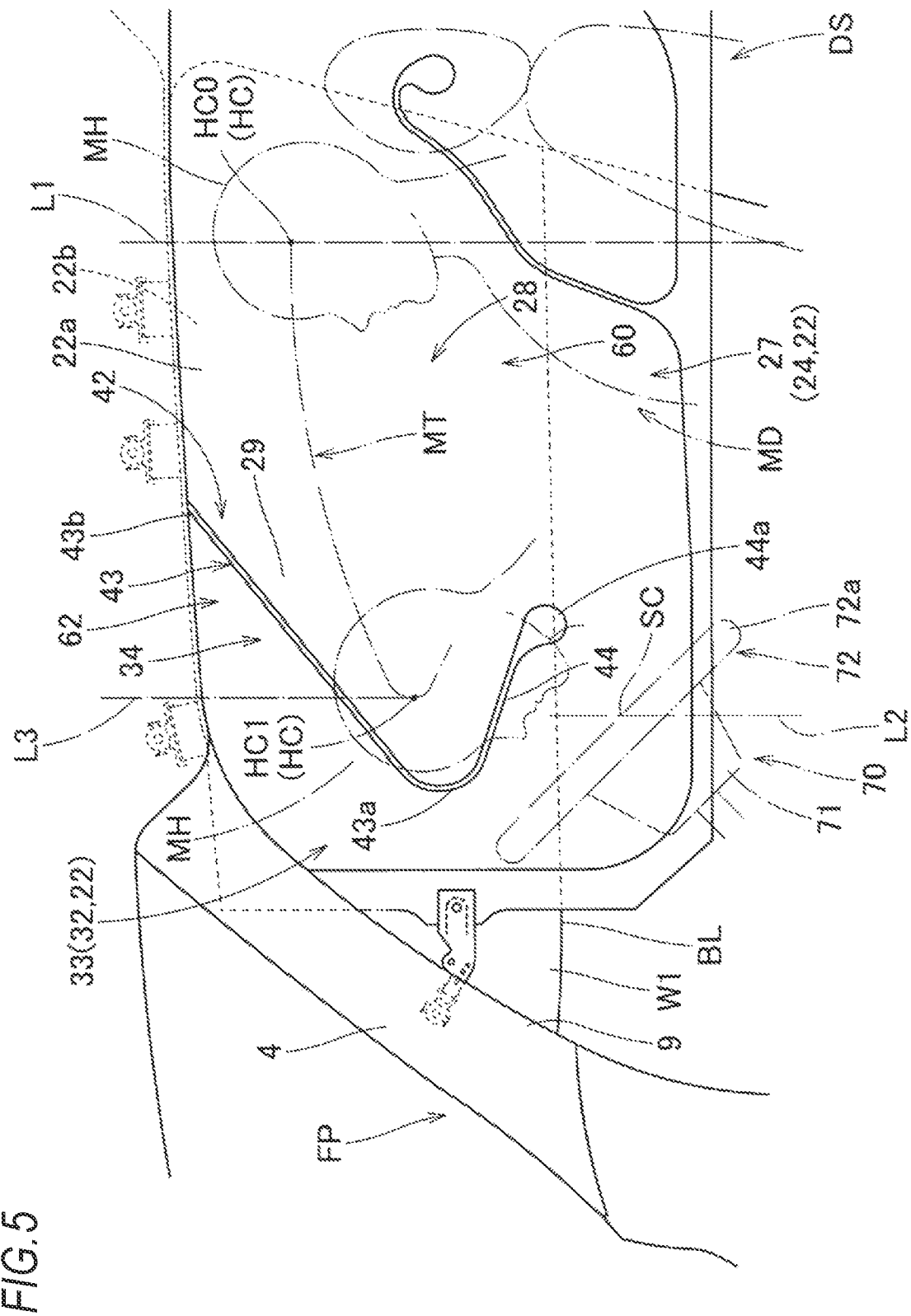
FIG. 5 is a partially enlarged front view illustrating an area on a side of a driver's seat illustrating a state in which the airbag completes expansion in the head protection airbag device of the embodiment.

As illustrated in FIGS. 1, 4, and 5, the mounting bracket 11 is for attaching each connecting tab 50, which will be described below, formed on an upper edge 21*a* side of the airbag 20 to an upper edge side of the windows W1 and W2. Although detailed illustration is omitted, the mounting bracket 11 is made of sheet metal and is attached to each connecting tab 50 by being inserted into the connecting tab 50 formed in a loop shape. The mounting bracket 11 is attached to the inner panel 2 on the body 1 side by using the bolt 12.

Figure 2:
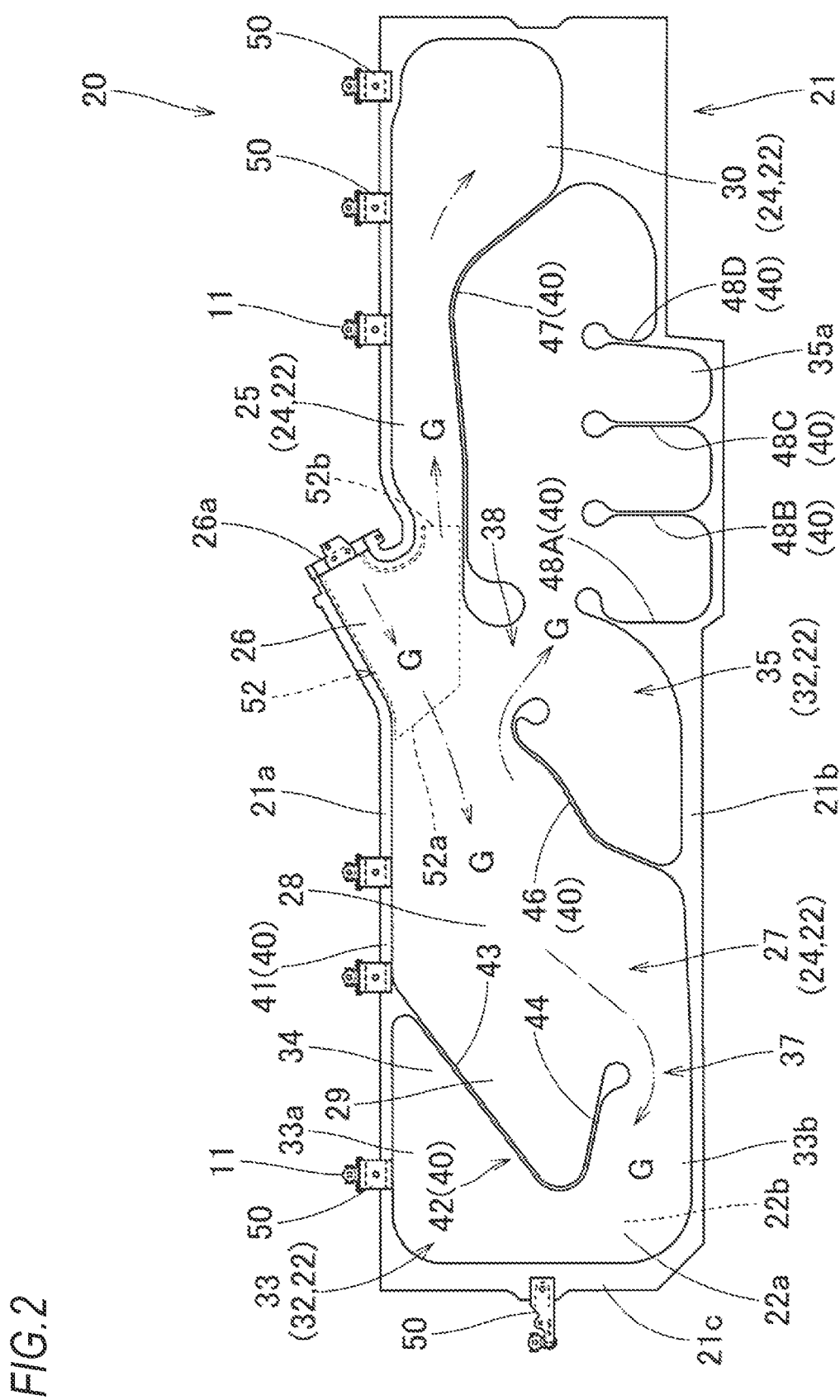
FIG. 2 is a front view illustrating a state in which an airbag used in the head protection airbag device of the embodiment is flatly deployed.
Figure 3:
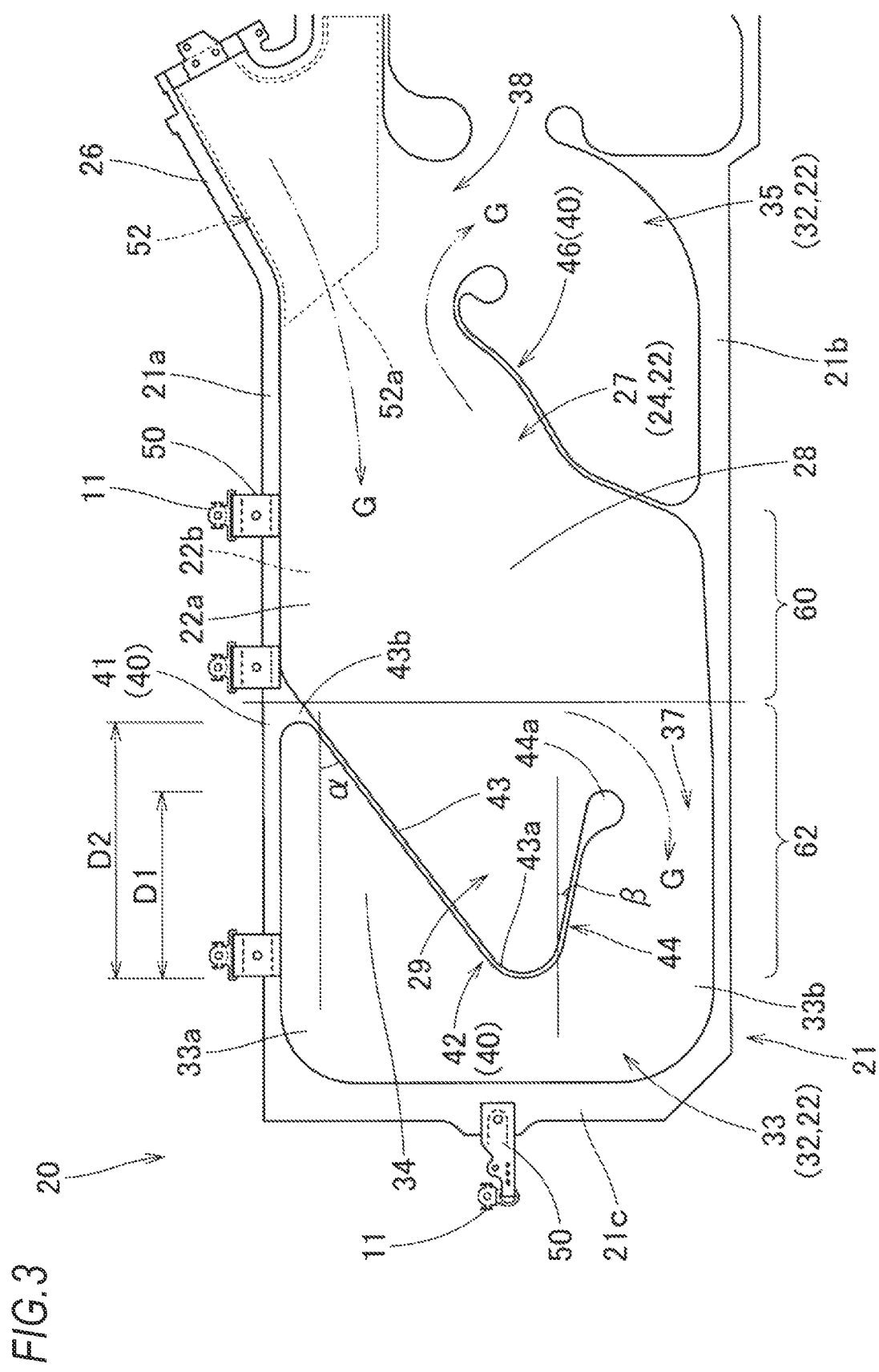
FIG. 3 is a partially enlarged front view illustrating a part of the airbag of FIG. 2 from a front seat protection portion to an end side expansion portion.

As illustrated in FIGS. 2 and 3, in the case of the embodiment, the airbag 20 includes a bag main body 21, the connecting tab 50 for attaching the bag main body 21 to the body 1 side, and an inner tube 52 arranged inside the bag main body 21.

The bag main body 21 has a flexible bag shape, and as illustrated by the alternate long and two short dashes line in FIG. 1 and FIGS. 4 to 8, the expansion gas from the inflator 14 is allowed to flow into the bag main body 21 to be deployed from a folded state, and then the bag main body 21 is configured to cover the windows W1 and W2, and a vehicle inner side I of pillar garnishes 6 and 7 of a center pillar portion CP and the rear pillar portion RP. The bag main body 21 has a substantially rectangular plate shape with a longitudinal direction substantially along the front-rear direction so that an outer shape when expansion is completed can cover from the window W1 through the center pillar portion CP and window W2 to a front side of the rear pillar portion RP (see FIGS. 2 and 4). In the case of the embodiment, as illustrated in FIGS. 4 and 5, a vertical width dimension of the bag main body 21 is set so that a lower edge when expansion is completed is positioned below a belt line BL which is lower edges of the windows W1 and W2.

In the case of the embodiment, the bag main body 21 is manufactured by bag weaving using polyamide yarn, polyester yarn, or the like. As illustrated in FIGS. 2, 3, 7, and 8, the bag main body 21 includes an expansion portion 22 which expands by inflowing the expansion gas into the expansion portion 22 so as to separate a vehicle inner side wall portion 22*a* located on the vehicle inner side I and a vehicle outer side wall portion 22*b* located on the vehicle outer side O when the expansion is completed, and a non-expansion portion 40 configured to connect the vehicle inner side wall portion 22*a* and the vehicle outer side wall portion 22*b* to prevent the expansion gas from flowing therein.

In the case of the embodiment, the expansion portion 22 include a primary expansion portion 24, which first expands by inflowing the expansion gas discharged from the inflator 14, and a secondary expansion portion 32, which expands by delaying the inflow of the expansion gas as compared with the primary expansion portion 24, so that ahead MH of an occupant MP can be protected even when the vehicle V is rolled over. The primary expansion portion 24 includes a gas guide flow path 25, the connection port portion 26, a front seat protection portion 27, and a rear seat protection portion 30. The secondary expansion portion 32 includes an end side expansion portion 33 and a center side expansion portion 35. The bag main body 21 of the embodiment is configured to expand by inflowing the expansion gas into the inside over substantially the entire surface except for a small area of a front side partition closing portion 42, a center side partition closing portion 46, a rear side partition closing portion 47, and thickness regulation partition portions 48A, 48B, 48C, and 48D. The front side partition closing portion 42, the center side partition closing portion 46, and the rear side partition closing portion 47 partition the gas guide flow path 25, the end side expansion portion 33, the front seat protection portion 27, the center side expansion portion 35, and the rear seat protection portion 30. The thickness regulation partition portions 48A, 48B, 48C, and 48D partition inside of the center side expansion portion 35.

As illustrated in FIG. 2, the gas guide flow path 25 is provided so as to extend substantially along the front-rear direction on the upper edge 21*a* side of the bag main body 21. The gas guide flow path 25 is configured to guide the expansion gas G discharged from the inflator 14 to the front seat protection portion 27 and the rear seat protection portion 30 arranged below the gas guide flow path 25. In the gas guide flow path 25, at a position (substantially the center in the front and rear of the bag main body 21) behind and above the front seat protection portion 27, the connection port portion 26 connected to the inflator 14 is provided so as to communicate with the gas guide flow path 25 and protrude upward from the gas guide flow path 25. In the case of the embodiment, the connection port portion 26 is formed so as to be inclined rearward and upward with respect to the gas guide flow path 25 and a rear end 26*a* side is opened so that the inflator 14 can be inserted. The connection port portion 26 is connected to the inflator 14 by fitting a clamp 15 on an outer peripheral side with the inflator 14 inserted inside. In the bag main body 21, the inner tube 52 for increasing heat resistance is provided at a part from the connection port portion 26 to a part directly below the connection port portion 26 in the gas guide flow path 25 (see FIGS. 2 and 3). The inner tube 52 has a configuration in which gas outlets 52*a* and 52*b* for flowing out the expansion gas G are provided on the front end side and the rear end side. The expansion gas G flowing in from the connection port portion 26 flows from the two gas outlets 52*a* and 52*b* to the front side and the rear side of the gas guide flow path 25 through the inner tube 52 (see FIGS. 2 and 3).

The front seat protection portion 27 is arranged on a side of the front seat (driver's seat DS) when the expansion is completed. The front seat protection portion 27 is a part for protecting the head MH of the occupant MP (driver) seated in the front seat (driver's seat DS) when the airbag 20 completes the expansion at the time of a side collision. The front seat protection portion 27 is configured to extend below the belt line BL when the expansion of the airbag 20 is completed (see FIGS. 4 and 5). The rear seat protection portion 30 is arranged on a side of a rear seat when the expansion is completed. The rear seat protection portion 30 is a part for protecting a head of an occupant seated in the rear seat when the airbag 20 completes the expansion at the time of a side collision.

The end side expansion portion 33 is arranged on a front end 21*c* side of the bag main body 21 so as to be adjacent to a front side of the front seat protection portion 27 which is the primary expansion portion 24. The end side expansion portion 33 and the front seat protection portion 27 adjacent to the rear side are partitioned by the front side partition closing portion 42 described below. In the case of the embodiment, the end side expansion portion 33 is configured to have an expansion completed shape which is the narrowest width in a vertical intermediate part and wide in an upper end 33*a* side and a lower end 33*b* side (see FIGS. 2 and 3). The end side expansion portion 33 is configured to extend below the belt line BL when the expansion of the airbag 20 is completed. The end side expansion portion 33 has a configuration in which the expansion gas is allowed to flow into the inside through the front seat protection portion 27 to expand the end side expansion portion 33. In the case of the embodiment, the end side expansion portion 33 is closed on the upper end 33a side and communicated with the front seat protection portion 27 by a communication portion 37 provided on the lower end 33b side. In the case of the embodiment, the communication portion 37 is arranged at a position below the belt line BL when the expansion of the airbag 20 is completed (see FIGS. 4 and 5). That is, the end side expansion portion 33 and the front seat protection portion 27 are configured to communicate with each other in an area below the belt line BL when the expansion is completed. The end side expansion portion 33, which is the secondary expansion portion 32, expands by delaying the inflow of the expansion gas as compared with the front seat protection portion 27, which is the primary expansion portion 24.

The center side expansion portion 35 is located between the front seat protection portion 27, which is the primary expansion portion 24, and the rear seat protection portion 30, and is arranged in an area below the gas guide flow path 25. The center side expansion portion 35 is communicated with the front seat protection portion 27 by a communication portion 38 arranged on a rear upper side of the front seat protection portion 27. The center side expansion portion 35 is configured to extend below the belt line BL when the expansion is completed. In the center side expansion portion 35, a plurality of (four in the case of the embodiment) thickness regulation partition portions 48A, 48B, 48C, and 48D for regulating the thickness dimension at the time of completion of expansion are provided on the front-rear direction side in an area on a lower end 35a side located below the belt line BL, whereby thinly expanding an area on the lower end 35a side located below the belt line BL (see FIG. 4). The communication portion 38 which communicates the center side expansion portion 35 with the front seat protection portion 27 is specifically formed at a position substantially directly below the connection port portion 26 (a boundary part between the connection port portion 26 and the gas guide flow path 25). In the airbag 20 of the embodiment, as described above, the inner tube 52 is provided at a part from the connection port portion 26 to a part directly below the connection port portion 26 in the gas guide flow path 25. Therefore, the expansion gas G flows from the two gas outlets 52a and 52b formed in the inner tube 52 toward the front side and the rear side of the gas guide flow path 25, and thus the expansion gas G does not flow directly into the center side expansion portion 35 from the communication portion 38. In the center side expansion portion 35, the expansion gas G which flows into the front seat protection portion 27 through the gas outlet 52a flows into the inside through the communication portion 38 (see FIG. 3). That is, the center side expansion portion 35, which is the secondary expansion portion 32, expands by delaying the inflow of the expansion gas as compared with the front seat protection portion 27, which is the primary expansion portion 24.

As illustrated in FIGS. 2 and 3, the non-expansion portion 40 includes a peripheral edge portion 41 forming an outer peripheral edge of the expansion portion 22, and the front side partition closing portion 42, the center side partition closing portion 46, the rear side partition closing portion 47, and the thickness regulation partition portions 48A, 48B, 48C, and 48D which are located in an area of the expansion portion 22.

The peripheral edge portion 41 is arranged so as to surround the periphery of the expansion portion 22 over the entire circumference except for the rear end 26a side of the connection port portion 26. The connecting tabs 50 for attaching the upper edge 21a of the bag main body 21 to the body 1 side, which are separate from the bag main body 21, are provided at a plurality of (in the case of the embodiment, six locations) locations of the peripheral edge portion 41 of the part which form the upper edge 21a of the bag main body 21 and at one location on the front end 21c side of the bag main body 21. As described above, the connecting tab 50 has a loop shape into which the mounting bracket 11 can be inserted.

The front side partition closing portion 42 partitions the end side expansion portion 33 and the front seat protection portion 27. In the case of the embodiment, the front side partition closing portion 42 is configured by connecting an upper end side (a rear end 43b side of a main body portion 43) with the peripheral edge portion 41 and separating a lower end side (a tip 44a side of an inversion portion 44) from the peripheral edge portion 41. Specifically, as illustrated in FIGS. 2 and 3, in a state where (in a state where the airbag 20 is viewed from the side when the expansion is completed) the bag main body 21 is deployed flatly, the front side partition closing portion 42 includes the main body portion 43, which is formed to be inclined forward and downward, and the inversion portion 44 formed so as to extend rearward and downward on a front end 43a side of the main body portion 43. Therefore, the front side partition closing portion 42 has a substantially "<"-shaped linear shape. Specifically, in the case of the embodiment, the front side partition closing portion 42 has a linear shape whose thickness (width dimension) is set within a range of 4 mm to 10 mm. In a case where the bag main body 21 is viewed from the side when the expansion is completed, the front side partition closing portion 42 is configured to position the rear end 43b of the straight line shaped main body portion 43 on a front side of a seating reference line L1 along the up-down direction (vertical direction) passing through a center HC0 of the head MH of the occupant MP (equivalent to AM50 dummy) seated in the driver's seat DS (front seat) (see FIG. 5). In the case of the embodiment, in the bag main body 21, the rear end 43b of the main body portion 43 is arranged at a position substantially the center in the front and rear of an area in front of the connection port portion 26 (see FIGS. 2 and 3). When the bag main body 21 is viewed from the side when the expansion is completed, in the forward and downward inclined state, the main body portion 43 is configured so that the front end 43a side is closer to a movement locus MT of the head MH which moves diagonally forward than the rear end 43b side (see FIG. 5). In a state where the occupant MP moves diagonally forward while leaning forward so that an upper body approaches a lower body starting from a waist while the waist is restrained by a seat belt (not illustrated) at the time of a diagonal collision or offset collision of the vehicle V, the movement locus MT of the head MH illustrates a state in which the movement locus MT of ahead center HC is viewed from the side. Specifically, it is a state in which the movement locus MT of the head center HC is viewed from the side when the vehicle V is offset-collided at a speed of 90 km/h with a collision angle of 15° and a lap amount of 35%. Specifically, in the case of the embodiment, the main body portion 43 has a substantially straight line shape extending diagonally downward. The bag main body 21 is configured so that an inclination angle α with respect to the front-rear direction in the flatly deployed state is 45° or less (see FIG. 3). More specifically, the inclination angle α of the main body portion 43 with respect to the front-rear direction is set to about 40°.

Also, in a state where the front end 43a is viewed from the side of the airbag 20 when expansion is complete, the main body portion 43 is configured to be positioned in front of a rear end 72a of a ring portion 72 of a steering wheel 70 arranged in front of the driver's seat DS. In particular, the main body portion 43 is configured to position the front end 43a in front of a steering reference line L2 along the vertical (up-down) direction passing through a steering center SC (intersection between a rotation center and a surface of a boss portion 71) in the steering wheel 70 (see FIG. 5). By locating a front end (the front end 43a of the main body portion 43) of the front side partition closing portion 42 in front of the steering center SC in this way, a collaborative receiving area 62 described below can be arranged up to an area above the steering wheel 70. Therefore, even when the head MH of the occupant MP moves forward until the head MH approaches the steering wheel 70, the head MH can be smoothly received. In fact, in the movement locus MT of the head MH of the occupant MP which moves diagonally forward, the front end 43a of the main body portion 43 is located on a front side (which can be said to be an upper side) of the movement reference line L3 (see FIG. 5) along the up-down direction (vertical direction) passing through a head center HCl when the movement is completed. Further, in the embodiment, the front side partition closing portion 42 is configured so that the tip 44a of the inversion portion 44 is arranged at a position substantially coincided with the belt line BL in a state where the airbag 20 is viewed from the side when the expansion is completed (see FIGS. 4 and 5). That is, the front end 43a of the main body portion 43 is arranged at a position above the belt line BL. The inversion portion 44 has a straight line shape. In the inversion portion 44, an inclination angle β with respect to the front-rear direction is set to about 15° and a width dimension D1 on the front-rear direction side is set to about ¾ of a width dimension D2 on the front-rear direction side of the main body portion 43 (see FIG. 3). A gap between the tip 44a of the inversion portion 44 and the peripheral edge portion 41 forms the communication portion 37.

As illustrated in FIGS. 2 and 3, the center side partition closing portion 46 is provided so as to extend rearward and upward from a lower edge side of the peripheral edge portion 41 and partitions the front seat protection portion 27 and the center side expansion portion 35. As illustrated in FIG. 2, the rear side partition closing portion 47 is provided so as to extend forward from a rear lower edge side of the peripheral edge portion 41. The rear side partition closing portion 47 partitions the center side expansion portion 35 and a group of the rear seat protection portion 30, the gas guide flow path 25. A gap between the center side partition closing portion 46 and the rear side partition closing portion 47 forms the communication portion 38. As illustrated in FIG. 2, in an area of the center side expansion portion 35, the thickness regulation partition portions 48A, 48B, 48C, and 48D are provided so as to extend upward from the lower edge of the peripheral edge portion 41 and are arranged side by side at four locations on the front-rear direction side.

The airbag 20 of the embodiment is configured to be provided with a single receiving area 60 which receives the head MH which moves diagonally forward at the time of a diagonal collision or offset collision of the vehicle V by the front seat protection portion 27 and the collaborative receiving area 62 which receives the head MH by the front seat protection portion 27 and the end side expansion portion 33. At the time of diagonal collision or offset collision of the vehicle V, the occupant MP moves diagonally forward while leaning forward so that the upper body approaches the lower body starting from the waist in a state where the waist is restrained by a seat belt (not illustrated). Then, in the front seat protection portion 27 covering the side of the head MH, the head MH which moves diagonally forward with such movement comes into contact with the vehicle inner side wall portion 22a in an area of a rear side part 29. Next, the head MH moves diagonally forward and downward with respect to the airbag 20 so as to diagonally enter the airbag 20 while maintaining contact with the vehicle inner side wall portion 22a (see the alternate long and short dash line in FIGS. 5 and 8). Then, a seatbelt lock (not illustrated) restricts the head MH from further movement and the movement is completed (after the movement is completed, the head MH will be swung back slightly rearward and downward due to the reaction, as illustrated in the movement locus MT in FIG. 5). Specifically, as illustrated in FIG. 3, in the front seat protection portion 27, the single receiving area 60 is formed by the vehicle inner side wall portion 22a of an area (specifically, the rear side part 29 of the front seat protection portion 27) from the side of the head MH of the occupant MP when the occupant MP seats on the driver's seat DS to a position substantially directly below the rear end 43b of the main body portion 43 of the front side partition closing portion 42. The collaborative receiving area 62 is adjacent to the front side of the single receiving area 60 and is composed of a peripheral edge area in substantially the entire area of the main body portion 43 in the front side partition closing portion 42. Specifically, the collaborative receiving area 62 is composed of the vehicle inner side wall portion 22a of an upper side part 34 forming an upper side of the main body portion 43 in the end side expansion portion 33 and the vehicle inner side wall portion 22a of a front side part 28 forming a lower side of the main body portion 43 in the front seat protection portion 27 (see FIG. 3). That is, the collaborative receiving area 62 is composed of a vehicle inner side surface (vehicle inner side wall portion 22a) of the end side expansion portion 33 and the front seat protection portion 27 with the front side partition closing portion 42 (main body portion 43) interposed therebetween.

Next, mounting of the head protection airbag device M of the embodiment on the vehicle V will be described. First, the bag main body 21 in which the vehicle inner side wall portion 22a and the vehicle outer side wall portion 22b are deployed flatly is folded so that a lower edge 21b side approaches the upper edge 21a side, in such a manner that the airbag 20 is folded. In the embodiment, although detailed illustration is omitted, the part of the gas guide flow path 25 on the upper edge 21a side is made by making a plurality of creases along the front-rear direction and folded in a bellows and an area below the gas guide flow path 25 is roll-folded so as to be rolled from the lower edge 21b side toward the vehicle outer side, in such a manner that the bag main body 21 is folded. After the folding of the airbag 20 is completed, a predetermined location of the folded airbag 20 is wrapped with a wrapping material (not illustrated) which can be broken and prevent the airbag 20 from collapsing.

Then, the inflator 14 to which the mounting bracket 16 is attached is connected to the connection port portion 26 of the airbag 20 by using the clamp 15 and the mounting bracket 11 is inserted into each connecting tab 50 to form an airbag assembly. Next, the mounting brackets 11 and 16 are arranged at predetermined positions on the inner panel 2 on the body 1 side and the bolts 12 and 17 are fastened, and further a lead wire (not illustrated) extending from a predetermined control device for operating the inflator is connected to the inflator 14. Then, the front pillar garnish 4 and the roof head lining 5 are attached to the inner panel 2 on the body 1 side and the pillar garnishes 6 and 7 are attached to the inner panel 2 on the body 1 side. In this way, the head protection airbag device M can be mounted on the vehicle V.

After mounting the head protection airbag device M of the embodiment on the vehicle V, at the time of a side collision, an oblique collision, an offset collision, or a rollover of the vehicle V, when the inflator 14 is activated in response to an operation signal from a control device (not illustrated), the expansion gas discharged from the inflator 14 flows into the bag main body 21 and the expanding bag main body 21 breaks the wrapping material (not illustrated). Further, the bag main body 21 pushes open the airbag cover 9 including the lower edge of the front pillar garnish 4 and the roof head lining 5 and while projecting downward, as illustrated by the alternate long and two short dashes line in FIG. 1 and FIGS. 4 to 8, the bag main body 21 expands greatly so as to cover the windows W1 and W2, the center pillar portion CP, and the vehicle inner side I of the rear pillar portion RP.

Figure 6:
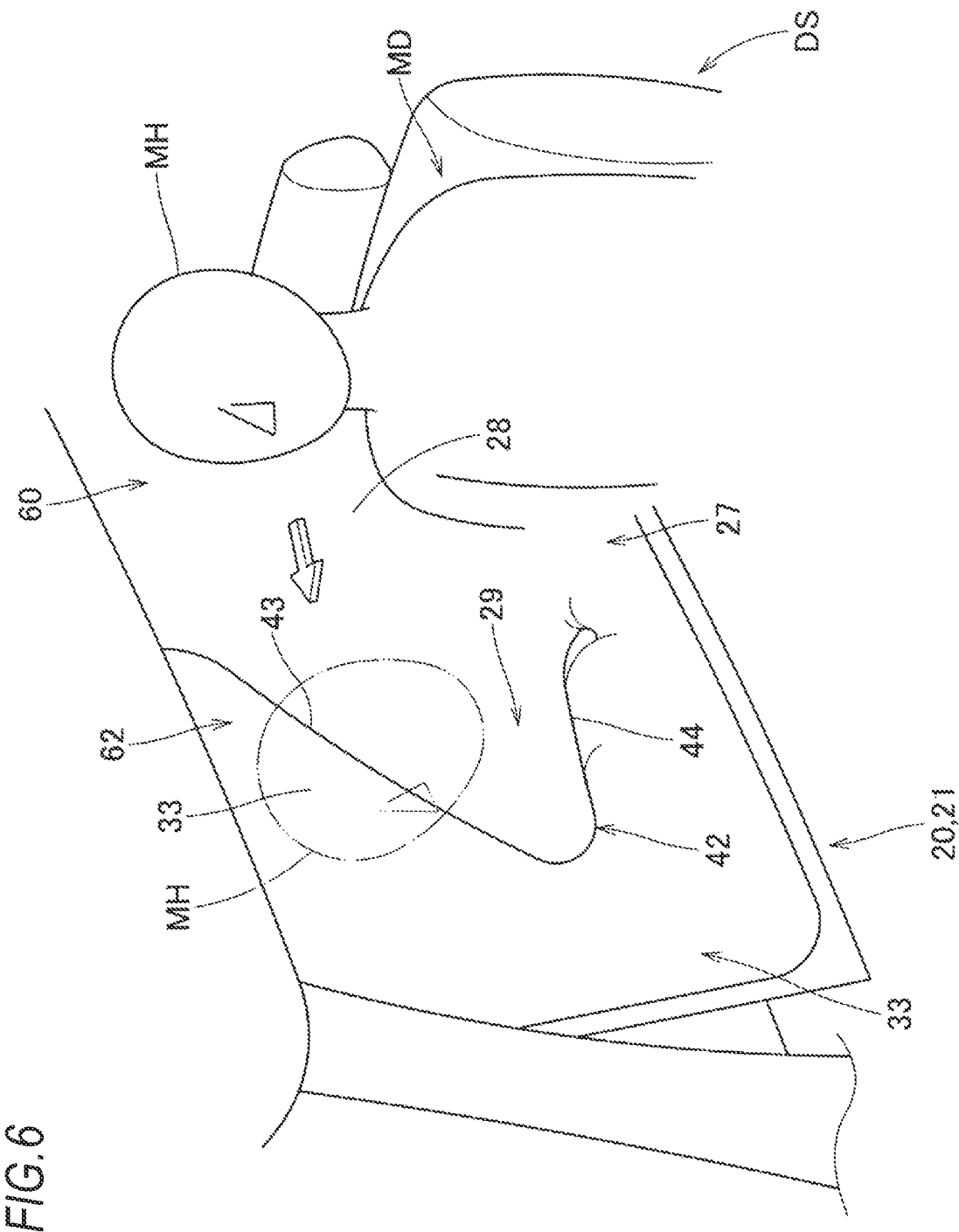
FIG. 6 is a schematic perspective view of a state in which the airbag completes expansion in the head protection airbag device of the embodiment as viewed from the vehicle inner side.
Figure 7:
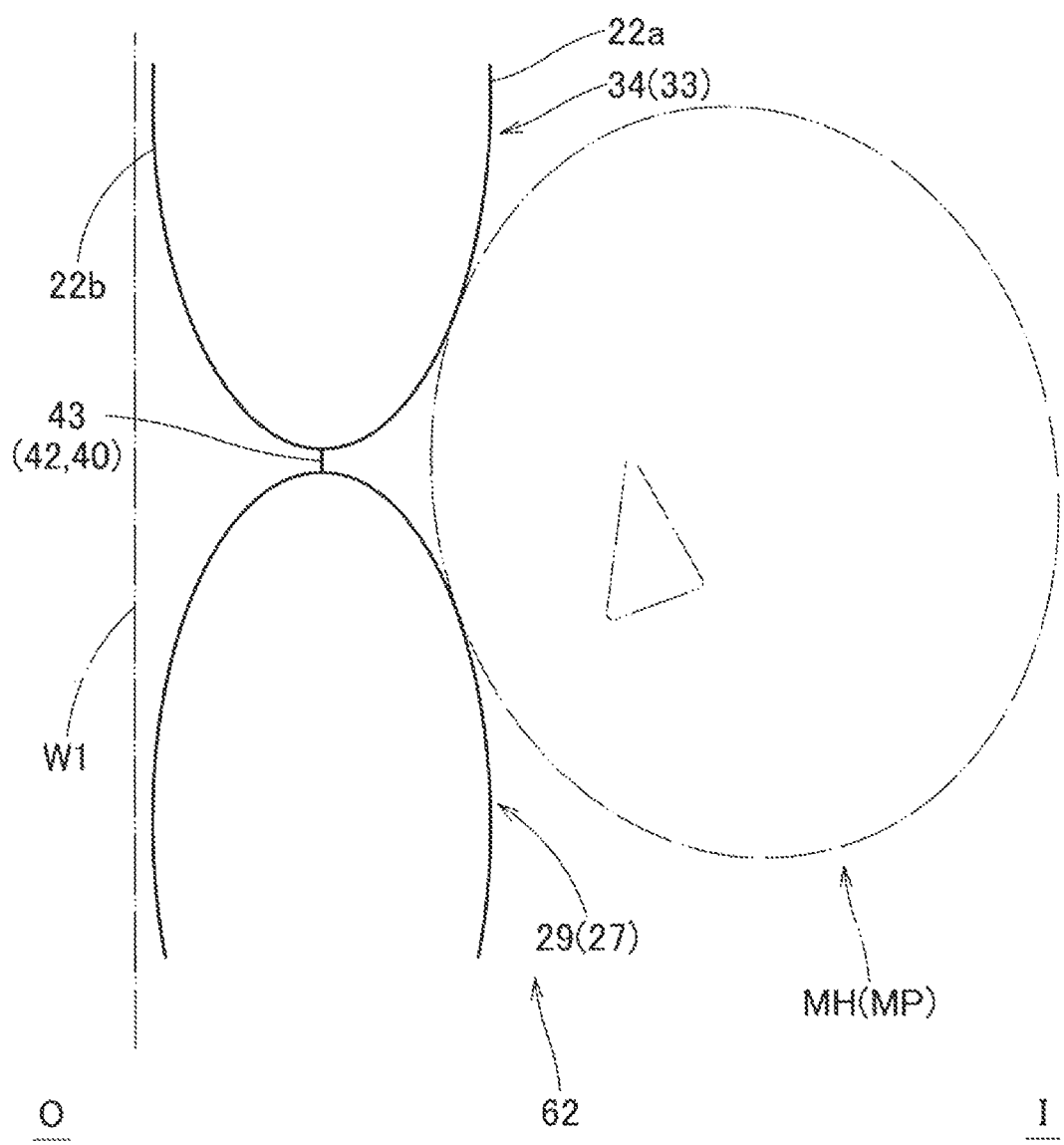
FIG. 7 is a schematic vertical cross-sectional view illustrating a state in which a head moving diagonally forward comes into contact with an expanded airbag in the head protection airbag device of the embodiment.

In the head protection airbag device M of the embodiment, the head MH of the occupant MP which moves diagonally forward at the time of an oblique collision or an offset collision of the vehicle V is first received by the front seat protection portion 27 (specifically, the rear side part 29 of the front seat protection portion 27) in the single receiving area 60, and then in the collaborative receiving area 62, the head MH is received by the front seat protection portion 27 (the front side part 28 of the front seat protection portion 27) and the end side expansion portion 33 (the upper side part 34 of the end side expansion portion 33) (see the alternate long and short dash line in FIG. 8). However, as illustrated in FIGS. 5 and 6, the linear front side partition closing portion 42 which partitions the front seat protection portion 27 and the end side expansion portion 33 is formed so as to be inclined forward and downward and the collaborative receiving area 62 includes the vehicle inner side surface (the vehicle inner side wall portion 22a) of the end side expansion portion 33 (the upper side part 34) and the front seat protection portion 27 (the front side part 28) with the front side partition closing portion 42 interposed therebetween. Therefore, when the head MH is viewed from a side which is the vehicle inner side, the head MH of the occupant MP which moves diagonally forward while coming into contact with the vehicle inner side wall portion 22a of the airbag 20 does not move so as to straddle the front side partition closing portion 42 on an orthogonal direction side, but moves substantially along the front side partition closing portion 42 (see FIGS. 5 and 6). As a result, the head MH of the occupant MP which moves diagonally forward can be smoothly moved from the single receiving area 60 to the collaborative receiving area 62 while being received by the end side expansion portion 33 and the front seat protection portion 27. In addition, in the collaborative receiving area 62, the head MH moves diagonally forward while being in contact with both the end side expansion portion 33 and the front seat protection portion 27 with the front side partition closing portion 42 provided therebetween (see FIG. 7), and thus a contact area of the airbag 20 itself with the head MH is also small. Therefore, it is possible to suppress as much as possible the generation of a force which causes the head MH of the occupant MP which moves diagonally forward to rotate toward the vehicle inner side along a horizontal direction, and thus the head MH of the occupant MP can be smoothly moved diagonally forward while being in contact with the airbag 20 and the head MH can be received by the end side expansion portion 33. Although not illustrated in detail, the steering wheel 70 contains an airbag expanding to cover the entire upper surface of the steering wheel 70. Therefore, actually, the occupant MP will be received by an inflated airbag for the steering wheel and the end side expansion portion 33. In the head protection airbag device M of the embodiment, unlike the head protection airbag device of the related art, without using an extra member, by adjusting the arrangement position and shape of the front side partition closing portion 42 which partitions the end side expansion portion 33 having a configuration which expands by inflowing the expansion gas into the inside through the front seat protection portion 27 and the front seat protection portion 27, such an effect can be obtained. As a result, the configuration can be simplified. Also, since no extra member is used, the airbag 20 can be folded compactly and is not bulky, and further the airbag 20 can be smoothly accommodated in a narrow accommodation space on the upper edge side of the windows W1 and W2.

Therefore, in the head protection airbag device M of the embodiment, as a simple configuration, the head MH of the occupant MP which moves diagonally forward can be smoothly restrained by the airbag 20 which completes expansion.

In the head protection airbag device M of the embodiment, in a state where the airbag 20 is viewed from the side when the expansion is completed, the front side partition closing portion 42 is configured so that the rear end (the rear end 43b of the main body portion 43) is located on a front side of the seating reference line L1 along the up-down direction passing through the center HC0 of the head MH of the occupant MP in a state w % here the occupant MP is seated in the driver's seat DS as the front seat (see FIG. 5). That is, in the front seat protection portion 27, the front side partition closing portion 42 is not arranged above and below the area (the rear side part 29) which protects the head MH of the occupant MP at the time of a side collision. Therefore, it is possible to sufficiently secure the thickness of the area (the rear side part 29) which protects the head MH of the occupant MP at the time of side collision when the expansion is completed. When such a point is not taken into consideration, the front side partition closing portion may be configured so that the rear end is located on the rear side of the reference line passing through the center of the head.

Further, in the head protection airbag device M of the embodiment, in a state where the airbag 20 is viewed from the side when the expansion is completed, the main body portion 43 of the front side partition closing portion 42 is configured so that the front end 43a side is closer to the movement locus MT of the head MH moving diagonally forward than the rear end 43b side. Therefore, as compared with the case where the front side partition closing portion is inclined so as to be substantially along with the movement locus of the head, a large volume of the end side expansion portion 33 can be secured. When such a point is not taken into consideration, the front side partition closing portion may be configured to be inclined so as to be substantially along with the movement locus of the head.

Furthermore, in the head protection airbag device M of the embodiment, the front side partition closing portion 42 is configured such that the inversion portion 44 is provided on the front end 43a side of the main body portion 43 so as to invert rearward and downward. Therefore, since the end side expansion portion 33 has a part which becomes wider toward the lower side on the lower end 33*b* side, it is possible to secure a larger volume of the end side expansion portion 33. In the head protection airbag device M of the embodiment, the expansion gas is allowed to flow into the end side expansion portion 33 from the gap (the communication portion 37) on the lower end (the tip 44*a*) side of the inversion portion 44. Therefore, the start of inflow of the expansion gas into the end side expansion portion 33 can be reliably delayed as compared with the front seat protection portion 27. When such a point is not taken into consideration, the front side partition closing portion may be configured without an inversion portion.

In the head protection airbag device M of the embodiment, the main body portion 43 of the front side partition closing portion 42 is formed to be substantially straight line shape and the rear end 43*b* is connected to the peripheral edge portion 41. That is, the end side expansion portion 33 is configured by closing the upper end 33*a* side. The outer shape of the front side partition closing portion is not limited to the embodiment. The front side partition closing portion (the main body portion) may be configured to be curved instead of straight line shape and the rear end may be configured to be separated from the peripheral edge portion so as not to allow a large amount of the expansion gas to flow into the end side expansion portion.

In the embodiment, the head protection airbag device M arranged on the side (vehicle outer side) of the driver's seat DS is taken as an example for explanation. However, the present invention is, of course, also applicable to a head protection airbag device arranged on a side (vehicle outer side) of a passenger seat.

What is claimed is:

1. A head protection airbag device comprising:
    an airbag which is folded and accommodated on an upper edge side of a window on a vehicle inner side of a vehicle, an upper edge side of which is attached and fixed to a body side of the vehicle, and allows expansion gas from an inflator to flow in and deploys and expands to cover the vehicle inner side of the window while protruding downward, the airbag including
        a front seat protection portion which is arranged to cover a side of a head of an occupant seated in a front seat when expansion of the airbag is completed, and
        an end side expansion portion which is a front end side of the airbag when the expansion of the airbag is completed and is arranged adjacent to a front side of the front seat protection portion, the end side expansion portion being expanded by inflowing the expansion gas into an inside of the end side expansion portion through the front seat protection portion; and
    a partition closing portion which partitions the front seat protection portion and the end side expansion portion and is configured to connect a vehicle inner side wall portion arranged on the vehicle inner side and a vehicle outer side wall portion arranged on a vehicle outer side when the expansion of the airbag is complete; wherein
    the airbag is configured to be provided with:
        a single receiving area where the head which moves diagonally forward at the time of an oblique collision or an offset collision of the vehicle is received by the front seat protection portion;
        a collaborative receiving area where the head is received by the front seat protection portion and the end side expansion portion,
    the partition closing portion is linearly provided to be inclined forward and downward in a state where the airbag is viewed from a side when the expansion of the airbag is completed, and
    the collaborative receiving area includes vehicle inner side surfaces of the end side expansion portion and the front seat protection portion with the partition closing portion interposed therebetween,
    the partition closing portion includes:
        a main body portion which is formed to be inclined forward and downward in a state where the airbag is viewed from the side when the expansion of the airbag is completed; and
        an inversion portion provided on a front end side of the main body portion to invert rearward and downward, and
    a width of the inversion portion in a front-rear direction is set to about ¾ of a width of the main body portion in the front-rear direction.

2. The head protection airbag device according to claim 1, wherein
    in a state where the airbag is viewed from the side when the expansion of the airbag is completed, the partition closing portion is configured to position a rear end of the partition closing portion on a front side of a reference line along an up-down direction passing through a center of the head of the occupant seated in the front seat.

3. The head protection airbag device according to claim 1, wherein
    in a state where the airbag is viewed from the side when the expansion of the airbag is completed, the partition closing portion is configured so that a front end side is closer to a movement locus of the head moving diagonally forward than a rear end side.

4. The head protection airbag device according to claim 1, wherein
    an inversion portion is provided on a front end side of the partition closing portion to invert rearward and downward.

* * * * *